United States Patent [19]

Ramesh et al.

[11] Patent Number: 5,763,095
[45] Date of Patent: Jun. 9, 1998

[54] BREATHABLE FILM FOR CHEESE PACKAGING

[75] Inventors: Ram K. Ramesh, Greenville; Gautam P. Shah, Simpsonville, both of S.C.

[73] Assignee: W. R. Grace & Co.-Conn., Duncan, S.C.

[21] Appl. No.: 564,545

[22] Filed: Nov. 29, 1995

[51] Int. Cl.$^6$ .................................................. B32B 27/08
[52] U.S. Cl. ........................ 428/474.4; 428/475.5; 428/475.8; 428/476.1; 428/476.9
[58] Field of Search .................. 428/474.4, 475.5, 428/475.8, 476.1, 476.9

[56] References Cited

U.S. PATENT DOCUMENTS

| | | | |
|---|---|---|---|
| 3,646,156 | 2/1972 | Schneider et al. | 260/857 |
| 4,404,317 | 9/1983 | Epstein et al. | 524/538 |
| 4,410,661 | 10/1983 | Epstein et al. | 525/66 |
| 4,486,507 | 12/1984 | Schumacher | 428/476 |
| 4,515,924 | 5/1985 | Brooks et al. | 525/432 |
| 4,542,047 | 9/1985 | Donermeyer et al. | 427/374 |
| 4,746,562 | 5/1988 | Fant | 428/213 |
| 4,803,102 | 2/1989 | Raniere et al. | 428/35.2 |
| 4,826,955 | 5/1989 | Akkapeddi et al. | 528/324 |
| 4,908,272 | 3/1990 | Harada et al. | 428/412 |
| 4,909,726 | 3/1990 | Bekele | 428/34 |
| 4,952,628 | 8/1990 | Blatz | 525/58 |
| 5,418,068 | 5/1995 | Caluori et al. | 428/474 |
| 5,433,982 | 7/1995 | Yamada et al. | 428/35.7 |
| 5,480,690 | 1/1996 | Stenger et al. | 428/34 |

FOREIGN PATENT DOCUMENTS

| | | |
|---|---|---|
| 4017046 | 5/1995 | European Pat. Off. |
| 4309534C1 | 8/1994 | Germany. |
| 06293119 | 4/1995 | Japan. |
| 07117198 | 12/1995 | Japan. |
| 222632 | 11/1987 | New Zealand. |

OTHER PUBLICATIONS

Novamid X21 Mitsubishi Kasei 1–8.
Engineering Resins Emser Industries 1–11.
New Film Co–Extrusion Dev Proceedings of the F 1–24.
High Barrier Amorphous NY Proceedings of the F 1–18.
Amorphous Nylon Resin Selar PA–Nylon 6 1–5.
Modified Nylons Nylon Plastics 1–4.

*Primary Examiner*—E. Rollins Buffalow
*Attorney, Agent, or Firm*—Mark B. Quatt

[57] ABSTRACT

The present invention relates to a film material suitable for using in packaging oxygen sensitive products which emit carbon dioxide gas, such as high gassing cheeses. The multilayer film includes at least one layer containing a nylon copolymer, preferably a nylon terpolymer, having at least one aromatic comonomer comprising from about 10% to about 75% by weight of the copolymer. The resultant film material is characterized by a relatively high $CO_2$:$O_2$ transmission ratio; and a $CO_2$ transmission rate of at least 400 cc/m$^2$-day-atmosphere.

24 Claims, No Drawings

BREATHABLE FILM FOR CHEESE PACKAGING

FIELD OF THE INVENTION

This invention relates to packaging films, and more particularly to a multilayer film having a combination of relatively low oxygen transmission, and relatively high carbon dioxide transmission.

BACKGROUND OF THE INVENTION

Thermoplastic film, and in particular polyolefin materials, have been used for some time in connection with packaging of various articles including food products which require protection from the environment, an attractive appearance, and resistance to abuse during the storage and distribution cycle. Suitable optical properties are also desirable in order to provide for inspection of the packaged product after packaging, in the distribution chain, and ultimately at point of sale. Optical properties such as high gloss, high clarity, and low haze characteristics contribute to an aesthetically attractive packaging material and packaged product to enhance the consumer appeal of the product. Various polymeric materials have been used to provide lower gas permeability in order to reduce the transmission of oxygen through the packaging film and thereby retard the spoilage and extend the shelf life of products such as food items which are sensitive to oxygen.

Some cheese products are produced in such a way that the final cheese product emits a significant amount of carbon dioxide over time. In such cases, it is often desirable to provide a packaging material which is characterized by a relatively low oxygen transmission rate (i.e. good oxygen barrier), and a relatively high carbon dioxide transmission rate. A preferred $O_2$ transmission rate is no more than about 500 cc/m²-day-atmosphere (ASTM D 3985 at 73° F.), more preferably no more than about 250 cc/m²-day-atmosphere, and even more preferably no more than about 175 cc/m²-day-atmosphere. A preferred $CO_2$ transmission rate is at least about 750 cc/m²-day-atmosphere at 73° F., more preferably at least about 1000 cc/m²-day-atmosphere, most preferably at least about 1200 cc/m²-day-atmosphere. $CO_2$ transmission is measured using an analytical technique analogous to ASTM D 3985. The ratio of $CO_2$ transmission rate to $O_2$ transmission rate is preferably greater than 3:1, more preferably greater than about 5:1, and most preferably at least about 7:1.

It is also often desirable to include in a packaging film a shrink feature, i.e., the propensity of the film upon exposure to heat to shrink or, if restrained, create shrink tension within the packaging film. This property is imparted to the film by orientation of the film during its manufacture. Typically, the manufactured film is heated to an orientation temperature and then stretched in either a longitudinal (machine) direction, a transverse direction, or both, in varying degrees to impart a certain degree of shrinkability in the film upon subsequent heating. After being so stretched, the film is rapidly cooled to provide this latent shrinkability to the resulting film. One advantage of shrinkable film is the tight, smooth appearance of the wrapped product that results, providing an aesthetic package as well as protecting the packaged product from environmental abuse. Various food and non-food items may be and have been packaged in shrinkable films.

It is sometimes also desirable to orient a packaging film and thereafter heat set the film by bringing the film to a temperature near its orientation temperature. This produces a film with substantially less shrinkability, while retaining much of the advantages of orientation, including improved modulus and optical properties.

SUMMARY OF THE INVENTION

In one aspect, a multilayer film comprises a layer comprising a nylon copolymer comprising an aromatic comonomer, wherein the aromatic comonomer comprises between 10% and 75% by weight of said copolymer; and a further polymeric layer, wherein said film is characterized by a $CO_2:O_2$ transmission ratio higher than 3.0; and has a $CO_2$ transmission rate of at least 400 cc/m²-day-atmosphere.

In a second aspect, a multilayer film comprises a sealant layer; a core layer; and a layer comprising a nylon copolymer comprising an aromatic comonomer, wherein the aromatic comonomer comprises between 10% and 75% by weight of said copolymer; and wherein said film is characterized by a $CO_2:O_2$ transmission ratio higher than 3.0; and has a $CO_2$ transmission rate of at least 400 cc/m²-day-atmosphere.

In a third aspect, an oriented, heat shrinkable multilayer film comprises a first outer layer; a second outer layer; and an interior layer comprising a nylon copolymer comprising an aromatic comonomer, wherein the aromatic comonomer comprises between 10% and 75% by weight of said copolymer; and wherein said film is characterized by a $CO_2:O_2$ transmission ratio higher than 3.0; and has a $CO_2$ transmission rate of at least 400 cc/m²-day-atmosphere.

DEFINITIONS

As used herein, the term "comonomer" refers to a monomer which is copolymerized with at least one different monomer in a copolymerization reaction, the result of which is a copolymer.

As used herein, the term "copolymer" refers to polymers formed by the polymerization reaction of at least two different monomers. Thus, "copolymer" as used herein can mean terpolymer. The term "terpolymer" refers herein specifically to the copolymerization reaction product of three monomers.

As used herein, the phrase "ethylene alpha-olefin copolymer", and "ethylene/a-olefin copolymer", refer to such heterogeneous materials as linear low density polyethylene (LLDPE), linear medium density polyethylene (LMDPE) and very low and ultra low density polyethylene (VLDPE and ULDPE); and homogeneous polymers such as metallocene catalyzed polymers such as EXACT (TM) materials supplied by Exxon, and TAFMER (TM) materials supplied by Mitsui Petrochemical Corporation. These materials generally include copolymers of ethylene with one or more comonomers selected from $C_4$ to $C_{10}$ alpha-olefins such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. Other ethylene/a-olefin copolymers, such as the long chain branched homogeneous ethylene/a-olefin copolymers available from the Dow Chemical Company, known as AFFINITY (TM) resins, are also included as another type of ethylene alpha-olefin copolymer useful in the present invention.

As used herein, the term "polyamide" refers to polymers having amide linkages along the molecular chain, and preferably to synthetic polyamides such as nylons. Furthermore, such term encompasses both polymers comprising repeating units derived from monomers, such as caprolactam, which polymerize to form a polyamide, as well as copolymers of two or more amide monomers, including nylon terpolymers, also referred to generally as "copolyamides" herein.

As used herein, the term "polypropylene" refers to any polymer comprising propylene polymerization units, regardless of whether the polymer is a homopolymer or a copolymer.

As used herein, the term "propylene random copolymer" or, less preferably, "ethylene propylene copolymer" or "EPC" refers to polypropylene copolymerized with small amounts of ethylene comonomer. The term "ethylene propylene butene terpolymer" or "EPB" refers to a terpolymer incorporating these three comonomers in various percentages.

As used herein, the term "propylene butene copolymer" refers to the copolymerization reaction product of, at least, propylene and butene.

As used herein, the phrase "anhydride functionality" refers to any form of anhydride functionality, such as the anhydride of maleic acid, fumaric acid, etc., whether blended with one or more polymers, grafted onto a polymer, or copolymerized with a polymer, and, in general, is also inclusive of derivatives of such functionalities, such as acids, esters, and metal salts derived therefrom.

As used herein, the phrase "modified polymer", as well as more specific phrases such as "modified ethylene vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrase "anhydride-containing polymer" refers to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the phrase "aromatic comonomer" refers to a portion or moiety of a polyamide which comprises, consists essentially of, or consists of an aromatic material. Thus, the comonomer of a nylon copolymer which contains the aromatic material can be entirely made up of the aromatic material, or can include additional non-aromatic constituents. For example, in a 66/610/61 terpolymer, the aromatic comonomer is 61.

As used herein, the phrase "nylon copolymer comprising an aromatic comonomer" refers to a copolyamide comprising at least one member from each of the following two classes of monomers:

(1) substituted or unsubstituted aromatic dicarboxylic acid having 8 to 20 carbon atoms, and/or aromatic amine; and
(2) lactam having 6 to 12 carbon atoms, and/or aliphatic carboxylic acids having 4 to 12 carbon atoms, and/or aliphatic diamines having 4 to 12 carbon atoms.

A preferred aromatic dicarboxylic acid is isophthalic acid, terephthalic acid, or a mixture thereof. A preferred aromatic amine is m-xylylene diamine. Preferred lactams include laurolactam and caprolactam. A preferred aliphatic carboxylic acid is adipic acid. A preferred aliphatic diamine is hexamethylene diamine.

More preferred copolyamides are terpolymers incorporating the aromatic comonomer. Preferred terpolymers include 66/69/6I, 66/69/6T, 66/610/6I, 66/610/6T, 66/69/MXD6, and 66/610/MXD6, where I=isophthalic acid mer, T=terephthalic acid mer, and MXD=meta xylylene diamine mer. A more preferred terpolymer comprises a 66/69/6I terpolymer comprising 10 to 60% by weight hexamethylene adipamide mer, 10 to 60% by weight polyamide 69 mer, and 10 to 60% by weight hexamethylene isophthalamide mer. Most preferred is a terpolymer which comprises a 66/69/6I terpolymer comprising 20 to 50% by weight hexamethylene adipamide mer, 20 to 50% by weight polyamide 69 mer, and 10 to 40% by weight hexamethylene isophthalamide mer.

DETAILED DESCRIPTION OF PREFERRED EMBODIMENTS

The present invention relates to a film material which can be used to package products which are sensitive to oxygen but which also emit carbon dioxide for some period of time during packaging. The present film material is preferably a multilayer film in which one of the layers is formed from a nylon copolymer having at least one aromatic comonomer comprising from about 10% to about 75% by weight of the copolymer. Thus, particular nylon copolymers which can be incorporated into the film of the present invention are those which include at least a minor portion of an aromatic nylon comonomer. That is, the nylon copolymer has incorporated therein at least one aromatic acid or at least one aromatic amine. Nylon copolymers such as those described herein have been found to be advantageous in that they possess a desirable $CO_2:O_2$ transmission ratio at high relative humidities.

Looking to the specific end use application, it is common in the packaging of high gassing cheeses to package the cheese product in a polymeric film, cure the cheese at a relatively high humidity of typically between 40 and 85% RH, more typically 50 to 70% RH, and then store the cheese, prior to purchase by the consumer, for months at a relatively low humidity of typically between 60 to 0% RH. Prior art films such as those set forth in the comparative examples below, and especially those which contain a layer of a vinylidene chloride copolymer as a barrier layer, are relatively insensitive to changing relative humidity. Films made in accordance with the present invention, however, have the advantage of carbon dioxide transmission rates and $CO_2:O_2$ transmission ratios which are sensitive to changing relative humidity and which adjust in a manner which is especially advantageous for use in the conventional processing of high gassing cheeses. That is, during cure at high relative humidities the film materials of the present invention exhibit exceptionally high carbon dioxide transmission rates. The oxygen transmission rate also increases at high relative humidities but not enough to adversely affect the product. One can cure the cheese product at high relative humidities during curing followed by storage at low relative humidity (when oxygen barrier is more critical). During storage low oxygen transmission rates retard mold growth on the stored cheese.

Films of the present invention have a $CO_2:O_2$ transmission ratio greater than 3.0, and preferably greater than 4.0, more preferably greater than 5.0, and most preferably greater than 6.0. Especially preferred are ratios greater than 7.0, 8.0, and 9.0.

A partially aromatic nylon used as a core layer in a film enables the film to be sealed more easily than similar films having more conventional nylons such as nylon 6,66.

The layer comprising the partially aromatic nylon has a thickness of preferably 0.05 mil to 5 mil, more preferably 0.07 to 0.5 mil, and most preferably 0.1 to 0.3 mil.

If desired, the nylon copolymer used in the film of the present invention may be blended with another resin. For example, the nylon copolymer may be blended with another oxygen barrier resin such as ethylene vinyl alcohol copolymer (EVOH) in order to achieve a desired set of properties. Because EVOH loses much of its oxygen barrier properties with increasing relative humidity, the overall $CO_2:O_2$ transmission ratio during cure would not be greatly affected; but, the oxygen barrier during storage, when oxygen barrier properties become important, would be increased. That is, the addition of at least a minor portion of EVOH to a nylon copolymer-containing layer of the film of the present invention would serve to lower the oxygen transmission rate of the total film structure at low relative humidities.

Alternatively, the nylon copolymer of the present inventive film may be blended with or positioned directly adjacent to a hydrophilic material such as, for example, a polyether polyamide block copolymer. Such a material absorbs, at standard temperature and pressure, and at 100% RH, at least 2% by weight of the material of water, preferably at least 5%, more preferably 10%, even more preferably at least 15%, most preferably at least 20%, especially at least 25%. The presence of at least a minor amount of such a hydrophilic material could serve to attract moisture to the nylon copolymer and therefore, increase the $CO_2:O_2$ transmission ratio. The presence of a moisture attracting material, either mixed in with or immediately adjacent to the nylon copolymer of the present invention appears to allow the nylon copolymer to experience a higher relative humidity environment than if it were not present. Other examples of suitable hydrophilic materials are polyvinyl alcohol, and polyethylene oxide.

Similarly, the nylon copolymer of the film material of the present invention may be blended with other polymeric materials in order to achieve or optimize one or more desired film properties. For example, the partially aromatic nylon can be blended with another nylon which itself can be a partially aromatic nylon, or a conventional nylon such as nylon 6,66.

In the case of blends, the blend can range from 1–99% of the partially aromatic nylon and 99–1% of the second material, more preferably 25–75% of the partially aromatic nylon and 75% to 25% of the second material.

The film of the present invention may have any desired number of layers. Preferably, the various layers of the film are coextruded. However, lamination, extrusion coating and other techniques can also be employed in forming the multilayer film of the present invention. The nylon copolymer employed in the inventive film may be present either in an outer layer or an inner layer of the film. If desired, the film may contain more than one nylon copolymer-containing layer. If present as an exterior layer the nylon copolymer-containing layer may serve as a sealant layer or an abuse layer.

The multilayer film structure is preferably oriented and has been found to orient more easily than other more crystalline polyamides such as nylon 6, 66, and 6,66. Orientation is most preferably performed by a blown bubble technique out of either hot water, hot air, or infrared heating, although other orientation techniques such as, for example, tenter framing, may alternatively be employed. A film made from the present invention when oriented will have a free shrink at 185° F. of between 5 and 70%, and preferably 10 to 60%, more preferably 15 to 50%, even more preferably 20 to 40%, in either or both of the LD (longitudinal direction) or TD (transverse direction).

Orientation ratios are preferably between 2:1 and 7:1, more preferably between 3:1 and 5:1 in either or both of the LD (longitudinal direction) or TD (transverse direction).

The film of the present invention is optionally partially or completely crosslinked, preferably by electron beam irradiation, and most preferably prior to orientation although irradiation following orientation is also within the scope of the present invention. In the irradiation process, the film is subjected to an energetic radiation treatment, such as X-ray, gamma ray, beta ray, and high energy electron treatment, which induce cross-linking between molecules of the irradiated material. A preferred radiation dosage of high energy electrons is between 20 and 200 kGy (kilograys), more preferably between 25 and 150 kGy, most preferably between 50 and 100 kGy. Preferably, irradiation is carried out by an electron accelerator and the dosage level is determined by standard dosimetry methods.

Other structural layers which may be included in the multilayer film of the present invention include seal, core, abuse, and tie (adhesive) layers.

In addition to the nylon copolymer of the present invention or other polyamides, preferred resins for use in the seal layer of the present film include polyolefins. Specific materials which can be employed include polyolefins such as ethylene, propylene and butene homopolymers and copolymers, both heterogeneously and homogeneously catalyzed. Especially preferred are copolymers of ethylene and a comonomer such as an alpha-olefin, a vinyl acetate, an acrylate, or an acrylic acid. The seal layer is preferably between 0.05 and 5, more preferably between 0.3 and 2, and most preferably between 0.4 and 0.8 mils thick.

In addition to the nylon copolymer of the present invention or other polyamides, preferred resins for use in the core layer of the present film include polyolefins. Specific resins which may be employed include ethylene, propylene and butene homopolymers and copolymers, both heterogeneously and homogeneously catalyzed. Especially preferred are copolymers of ethylene and a comonomer such as an alpha-olefin, a vinyl acetate, an acrylate, or an acrylic acid. Preferred resins are those which have a melting point less than 140° C. and a crystallinity less than 60%; more preferably, those which have a melting point less than 120° C. and a crystallinity less than 40%. The core layer is preferably between 0.1 and 5, more preferably between 0.2 and 2, and most preferably between 0.4 and 1 mils thick.

In addition to the nylon copolymer of the present invention or other polyamides, preferred resins for use in the abuse layer of the present film include polyolefins. Specific resins which may be employed include ethylene, propylene and butene homopolymers and copolymers, both heterogeneously and homogeneously catalyzed. Especially preferred are copolymers of ethylene and a comonomer such as an alpha-olefin, a vinyl acetate, an acrylate, or an acrylic acid. Preferred resins are those which have a melting point greater than 80° C. and less than 140° C. and a crystallinity less than 60%; more preferably, those which have a melting point greater than 90° C. and less than 130° C. and a crystallinity less than 40%. The abuse layer is preferably between 0.1 and 5, more preferably between 0.2 and 2, even more preferably between 0.3 and 1, and most preferably between 0.4 and 0.7 mils thick.

Resins for use in tie layers of the present inventive film include modified polyamides and modified polyolefins such as anhydride grafted polyolefins. The preferred tie layer composition will depend on the composition of the core, sealant or abuse layer to which a nylon copolymer-containing layer is being adhered. Each tie layer is preferably between 0.05 and 0.5, more preferably between 0.1 and 0.3 mils thick.

The total film thickness of films made in accordance with the invention is preferably between 0.1 and 20 mils, more preferably between 0.3 and 10 mils, even more preferably between 0.5 and 5 mils, and most preferably between 1 and 3 mils. The film layer comprising the nylon copolymer comprising an aromatic comonomer preferably forms between 2 and 40%, more preferably between 5 and 30%, even more preferably between 8 and 20% of the total film thickness.

Preferred film structures employing the nylon of the present invention are:
Seal/Nylon/Seal
Seal/Tie/Nylon/Tie/Seal
Seal/Nylon as Abuse
Seal/Core/Nylon as Abuse
Seal/Nylon as Core/Abuse
Seal/Core/Nylon as Core/Abuse
Nylon as Seal/Core/Abuse
Seal/Core//Nylon as Core/Abuse
wherein double slashes (//) indicate extrusion coating of the layers on the right onto the layers on the left and wherein tie layers may be employed throughout as is appropriate.

The following examples are representative of preferred embodiments of the multilayer film of the present invention. The following resins were used in the production of films in accordance with the present invention:

CPA-1: FE 4470 from Emser, a nylon 6,6/6,9/6I terpolymer wherein the aromatic nylon comonomer comprises approximately 15% by weight of the total terpolymer.

CPA-2 FE 4492 from Emser, a nylon 6,6/610/MXD-6 terpolymer wherein the aromatic nylon comonomer comprises between 10% and 75% by weight of the total terpolymer.

CPA-3: XE3480 from Emser, a nylon 6,6/6,9/6I terpolymer wherein the aromatic nylon comonomer comprises approximately 15% by weight of the total terpolymer [this terpolymer is believed to be the same as CPA- 1].

CPA-4 FE 4480 from Emser, a nylon 6,6/6,9/6I terpolymer wherein the aromatic nylon comonomer comprises between 10% and 75% by weight of the total terpolymer.

EO1: Dowlex 2045 from Dow, a heterogeneous ethylene octene copolymer having a density of 0.920 g/cc.

EO2: Dowlex 2037 from Dow, a heterogeneous ethylene octene copolymer having a density of 0.935 g/cc.

EO3: a homogeneous ethylene alpha-olefin copolymer.

EVA-1: PE 1335 from Rexene, an ethylene vinyl acetate copolymer having 3.3% by weight of vinyl acetate.

EVA-2: PE 1651 CS 28 from Rexene, an ethylene vinyl acetate copolymer having 6.5% by weight of vinyl acetate.

EVA-3: Elvax 3128 from DuPont, an ethylene vinyl acetate copolymer having 9% by weight of vinyl acetate.

ADH-1: Bynel CXA 4104 from DuPont, an anhydride grafted polyolefin in an ethylene butene copolymer.

ADH-2: Tymor 1203 from Molton International, an anhydride grafted, rubber modified linear low density polyethylene based adhesive.

PBC-1: SRD-4-.140, a propylene butene random copolymer with 12% by weight of butene, supplied by Shell.

PBC-2: SRD-4-141, a propylene butene random copolymer with 14% by weight of butene, supplied by Shell.

ION: Surlyn 1650, a zinc salt of an ethylene methacrylic acid commonly referred to as an ionomer, supplied by DuPont.

HDPE: Fortiflex J60-800C- 147, a high density polyethylene supplied by Soltex.

MB: a polypropylene homopolymer-based masterbatch containing slip and antiblock additives.

EVOH: Eval LC E 105A from Evalca, an ethylene vinyl alcohol copolymer having 44 mole percent ethylene.

PEA: PEBAX 4011, a polyamide polyether block copolymer comprised of 50% of a nylon 6 and 50% of an ethylene glycol, supplied by Atochem.

EXAMPLE 1

A symmetrical five layer structure was coextruded, irradiated, and oriented out of hot air at 245° F., at 4.54×4.68 in the machine and transverse directions, respectively. The resultant film had an average thickness of 0.967 mil with the following structure and relative thicknesses:

| 50% EO1 + 25% EO2 + 25% EVA-1 | / | ADH-1 | / | CPA-1 | / | ADH-1 | / | 50% EO1 + 25% EO2 + 25% EVA-1 |
|---|---|---|---|---|---|---|---|---|
| 25% | / | 15% | / | 20% | / | 15% | / | 25% |

The outer skin layers also included minor amounts of an antiblock and an antifog agent. The film of Example 1 was tested for a variety of physical properties including strength, impact, shrink, optics, and oxygen and carbon dioxide transmission rates at varying relative humidities. The results are set forth in Table I below.

TABLE I

| Physical Property | | Results |
|---|---|---|
| Tensile @ Break (psi) | | |
| | LD | 15,359 |
| | TD | 16,192 |
| Elongation @ Break (%) | | |
| | LD | 80 |
| | TD | 56 |
| Modulus (psi) | | |
| | LD | 128,150 |
| | TD | 132,250 |
| Free Shrink (%) | | |
| @ 220° F. | LD | 20 |
| | TD | 29 |
| @ 240° F. | LD | 40 |
| | TD | 47 |
| @ 260° F. | LD | 61 |
| | TD | 63 |
| Ball Burst Impact (cm-kg) | | 12 |
| Instrumented Impact (lb) | | 14 |
| Haze (%) | | 10.2 |
| Clarity (%) | | 74 |
| Gloss, 45° | | 52 |
| $O_2$ Trans.(73° F. cc/24 hrs · m$^2$ · atm) | | |
| @ 0% RH | | 436 |
| @ 32% RH | | 48 |
| @ 80% RH | | 97 |
| $CO_2$ Trans.(73° F. cc/24 hrs · m$^2$ · atm) | | |
| @ 0% RH | | 2095 |
| @ 32% RH | | 550 |
| @ 80% RH | | 1421 |
| $CO_2/O_2$ Trans. ratio @ 73° F. | | |
| @ 0% RH | | 4.8 |
| @ 32% RH | | 11.4 |
| @ 80% RH | | 14.6 |

The film of Example 1 exhibited excellent tensile, modulus, free shrink at 260° F., and clarity values. There was a significant reduction in oxygen transmission rate from 0% to 32% relative humidity with an twofold increase in oxygen transmission from 32% and 80% relative humidity.

Similarly, there was a significant decrease in the carbon dioxide transmission rate from 0% to 32% relative humidity but a nearly threefold increase in carbon dioxide transmission from 32% to 80% relative humidity.

EXAMPLE 2

A symmetrical five layer structure was coextruded, irradiated, and oriented out of hot air at 240° F., at an orientation ratio of approximately 4×4 in the machine and transverse directions, respectively. The resultant film had an average thickness of approximately 1 mil with the following structure and relative thicknesses:

| 50% EO1 + 50% EO3 | / | ADH-1 | / | CPA-1 | / | ADH-1 | / | 50% EO1 + 50% EO3 |
|---|---|---|---|---|---|---|---|---|
| 32.5% | / | 10% | / | 15% | / | 10% | / | 32.5% |

The outer layers included minor amounts of slip and antiblock additives.

EXAMPLE 3

A symmetrical five layer structure was coextruded, irradiated, and oriented out of hot air at 248° F., at an orientation ratio of approximately 4×4 in the machine and transverse directions, respectively. The resultant film had an average thickness of approximately 1 mil with the following structure and relative thicknesses:

| PBC-1 | / | ADH-1 | / | CPA-1 | / | ADH-1 | / | PBC-1 |
|---|---|---|---|---|---|---|---|---|
| 32.5% | / | 10% | / | 15% | / | 10% | / | 32.5% |

The outer layers included minor amounts of slip and antiblock additives.

EXAMPLE 4

A symmetrical five layer structure was coextruded, irradiated, and oriented out of hot air at 254° F., at an orientation ratio of approximately 4×4 in the machine and transverse directions, respectively. The resultant film had an average thickness of approximately 1 mil with the following structure and relative thicknesses:

| 90% PBC-2 + 10% MB | / | ADH-1 | / | CPA-1 | / | ADH-1 | / | 90% PBC-2 + 10% MB |
|---|---|---|---|---|---|---|---|---|
| 32.5% | / | 10% | / | 15% | / | 10% | / | 32.5% |

Slip and antiblock additives were supplied in the masterbatch, MB, of the outer layers.

EXAMPLE 5

A symmetrical five layer structure was coextruded, irradiated, and oriented out of hot air at 240° F., at an orientation ratio of approximately 4×4 in the machine and transverse directions, respectively. The resultant film had an average thickness of approximately 1 mil with the following structure and relative thicknesses:

| 50% EO1 + 50% EO3 | / | ADH-1 | / | CPA-2 | / | ADH-1 | / | 50% EO1 + 50% EO3 |
|---|---|---|---|---|---|---|---|---|
| 32.5% | / | 10% | / | 15% | / | 10% | / | 32.5% |

The outer layers included minor amounts of slip and antiblock additives. The films of Examples 2 to 5 were tested for a variety of physical properties including tensile strength, impact, shrink, optics, and oxygen and carbon dioxide transmission rates at varying relative humidities. The results are set forth in Table 2 below.

TABLE 2

| Physical Property | Ex. 2 | Ex. 3 | Ex. 4 | Ex. 5 |
|---|---|---|---|---|
| Tensile @ Break (psi) | | | | |
| LD | 8,848 | 17,838 | 17,492 | — |
| TD | 8,269 | 15,296 | 17,326 | — |
| Elongation @ Break (%) | | | | |
| LD | 92 | 116 | 112 | — |
| TD | 87 | 82 | 95 | — |
| Modulus (psi) | | | | |
| LD | 72,717 | 184,370 | 187,690 | — |
| TD | 70,310 | 181,810 | 196,110 | — |
| Free Shrink (%) | | | | |
| @ 220° F. LD | 32 | 27 | 23 | 27 |
| TD | 40 | 31 | 28 | 37 |
| @ 240° F. LD | 52 | 41 | 39 | 55 |
| TD | 56 | 44 | 43 | 60 |
| @ 260° F. LD | 59 | 57 | 55 | 64 |
| TD | 62 | 58 | 57 | 65 |
| Haze (%) | 6.8 | 4.7 | 3.9 | 5.7 |
| Clarity (%) | 76 | 81 | 83 | 77 |
| Gloss, 45° | 65 | 71 | 79 | 75 |
| $O_2$ Trans.(73° F. cc/ 24 hrs · m$^2$ · atm) | | | | |
| @ 32% RH | 59 | 66 | 73 | 86 |
| @ 60% RH | 146 | 121 | 124 | 69* |
| @ 85% RH | 265 | 258 | 250 | 223** |
| @ 100% RH | 548 | 250 | 517 | 507 |
| $CO_2$ Trans.(73° F. cc/ 24 hrs · m$^2$ · atm) | | | | |
| @ 32% RH | 692 | 592 | 572 | 813 |
| @ 60% RH | 1307 | 1120 | 1240 | 621* |
| @ 85% RH | 2707 | 2163 | 2093 | 1707** |
| @ 100% RH | 4693 | 3557 | 3750 | 4853 |
| $CO_2/O_2$ Trans. ratio @ 73° F. | | | | |
| @ 32% RH | 11.7 | 9.0 | 7.8 | 9.5 |
| @ 60% RH | 9.0 | 9.3 | 10.0 | 9.0 |
| @ 85% RH | 10.2 | 8.4 | 8.4 | 7.7 |
| @ 100% RH | 8.6 | 7.1 | 7.3 | 9.6 |
| $O_2$ Trans.(40° F. cc/ 24 hrs · m$^2$ · atm) | | | | |
| @ 32% RH | 25 | 23 | 21 | — |
| @ 60% RH | 36 | 42 | 42 | 19.7* |
| @ 85% RH | 72 | 66 | 71 | — |
| @ 100% RH | 141 | 124 | 134 | — |
| $CO_2$ Trans.(40° F. cc/ 24 hrs · m$^2$ · atm) | | | | |
| @ 32% RH | 362 | 289 | 296 | — |
| @ 60% RH | 432 | 363 | 350 | 192* |
| @ 85% RH | 739 | 579 | 530 | — |
| @ 100% RH | 1530 | 1313 | 1363 | — |
| $CO_2/O_2$ Trans. ratio @ 40° F. | | | | |
| @ 32% RH | 14.5 | 12.6 | 14.1 | — |
| @ 60% RH | 12.0 | 8.6 | 8.3 | 9.7 |
| @ 85% RH | 10.3 | 8.8 | 7.5 | — |
| @ 100% RH | 10.9 | 10.6 | 10.2 | — |

*taken at 50% RH.
**taken at 80% RH

EXAMPLE 6

A six layer structure was coextruded, irradiated, and oriented out of hot water at 209° F., at 2.6×3.3 in the machine and transverse directions, respectively. The resultant film had an average thickness of approximately 2.3 mils with the following structure and relative thicknesses:

| ION | / | 80% EVA-2 + 20% EO1 | / | ADH-2 | / | CPA-3 | / | ADH-2 | / | 90% EVA-2 + 10% HDPE |
|---|---|---|---|---|---|---|---|---|---|---|
| 22% | / | 26% | / | 7% | / | 12% | / | 8% | / | 25% |

EXAMPLE 7

A six layer structure was coextruded, irradiated, and oriented out of hot water at 209° F., at 2.6×3.3 in the machine and transverse directions, respectively. The resultant film had an average thickness of approximately 2.3 mils with the following structure and relative thicknesses:

| ION | / | 80% EVA-2 + 20% EO1 | / | ADH-2 | / | CPA-3 | / | ADH-2 | / | 90% EVA-2 + 10% HDPE |
|---|---|---|---|---|---|---|---|---|---|---|
| 23% | / | 29% | / | 8% | / | 6% | / | 8% | / | 26% |

Films made in accordance with Examples 6 and 7 were tested for oxygen and carbon dioxide transmission rates at a variety of relative humidities. The results are set forth below in Table 3.

TABLE 3

| Physical Property | Example 6 | Example 7 |
|---|---|---|
| $O_2$ Trans. @ 73° F. (cc/24 hrs · m² · atm) | | |
| @ 0% RH | 357 | 586 |
| @ 32% RH | 66 | 89 |
| @ 50% RH | 150 | 204 |
| @ 80% RH | 140 | 220 |
| @ 100% RH | 406 | 617 |
| $CO_2$ Trans.(73° F. cc/24 hrs · m² · atm) | | |
| @ 0% RH | 2011 | 3090 |
| @ 32% RH | 560 | 829 |
| @ 50% RH | 1223 | 1997 |
| @ 80% RH | 1353 | 2076 |
| @ 100% RH | 3146 | 4379 |
| $CO_2/O_2$ Trans. ratio @ 73° F. | | |
| @ 0% RH | 5.6 | 5.3 |
| @ 32% RH | 8.5 | 9.3 |
| @ 50% RH | 8.2 | 9.8 |
| @ 80% RH | 9.7 | 9.4 |
| @ 100% RH | 7.7 | 7.1 |
| $O_2$ Trans. @ 45° F. (cc/24 hrs · m² · atm) | | |
| @ 0% RH | 156 | 248 |
| @ 32% RH | 19 | 27 |
| @ 50% RH | 40 | 57 |
| @ 80% RH | 41 | 61 |
| @ 100% RH | 89 | 152 |
| $CO_2$ Trans. @ 45° F. cc/24 hrs · m² · atm | | |
| @ 0% RH | 1289 | 2691 |

TABLE 3-continued

| Physical Property | Example 6 | Example 7 |
|---|---|---|
| @ 32% RH | 363 | 687 |
| @ 50% RH | 550 | 1020 |
| @ 80% RH | 702 | 1328 |
| @ 100% RH | 1420 | 2331 |
| $CO_2/O_2$ Trans. ratio @ 45° F. | | |
| @ 0% RH | 8.3 | 10.9 |
| @ 32% RH | 19.1 | 25.4 |
| @ 50% RH | 13.8 | 17.9 |
| @ 80% RH | 17.1 | 21.8 |
| @ 100% RH | 16.0 | 15.3 |

EXAMPLE 8

A six layer structure was coextruded, irradiated, and oriented out of hot water at 209° F., at 2.4×3.2 in the machine and transverse directions, respectively. The resultant film had an average thickness of approximately 3.0 mils with the following structure and relative thicknesses:

| ION | / | 70% EVA-2 + 30% EO1 | / | ADH-2 | / | CPA-3 | / | ADH-2 | / | 90% EVA-2 + 10% HDPE |
|---|---|---|---|---|---|---|---|---|---|---|
| 23% | / | 24% | / | 5% | / | 19% | / | 6% | / | 23% |

EXAMPLE 9

A six layer structure was coextruded, irradiated, and oriented out of hot water at 209° F., at 2.4×3.2 in the machine and transverse directions, respectively. The resultant film had an average thickness of approximately 3.0 mils with the following structure and relative thicknesses:

| ION | / 70% EVA-2 + 30% EO1 | / ADH-2 | / 80% CPA-3 + 20% EVOH | / ADH-2 | / 90% EVA-2 + 10% HDPE |
|---|---|---|---|---|---|
| 24% | / 25% | / 5% | / 16% | / 6% | / 24% |

COMPARATIVE EXAMPLE 1

The film of the present comparative example is a multilayer film of, primarily, olefinic materials and including a barrier layer of a vinylidene chloride copolymer, sold as B190 by the Cryovac Division of W. R. Grace & Co.-Conn. for cheese packaging applications. This material has a $CO_2/O_2$ of about 5:1, i.e. a $CO_2$ transmission rate of about 1000 cc/$m^2$-day-atmosphere and an $O_2$ transmission rate of about 200 cc/$m^2$-day-atmosphere. However, it is difficult to maintain consistent and stable transmission rates because of the effect of plasticizer migration, and gauge variation, on the transmission characteristics of this film.

COMPARATIVE EXAMPLE 2

The film of the present comparative example is a multilayer film of, primarily, olefinic materials and including a barrier layer of a vinylidene chloride copolymer, sold as B140 by the Cryovac Division of W. R. Grace & Co.-Conn. Because of a relatively low $CO_2$ transmission rate, this material has experienced gassing problems or mold growth when used in gassing cheese packaging applications. This material also has a $CO_2/O_2$ of about 5:1. However, the $CO_2$ transmission rate is typically less than about 150 cc/$m^2$-day-atmosphere, and the $O_2$ transmission rate about 30 cc/$m^2$-day-atmosphere. Thus, the $CO_2$ transmission rate is insufficient for most gassing cheese packaging applications.

COMPARATIVE EXAMPLE 3

The film of the present comparative example is a multilayer film of, primarily, olefinic materials, sold as E140 by the Cryovac Division of W. R. Grace & Co.-Conn. This material has a relatively high $CO_2$ transmission rate, and an $O_2$ transmission rate of greater than 750 cc/ $m^2$-day-atmosphere.

The films of Examples 6, 7, 8, and 9 and Comparative Examples 1-3 were fabricated into bags and were used in packaging uncured Swiss Cheese. Three sealed bags for each formulation were placed in a 50° F. refrigerator at 41% relative humidity and evaluated over a period of eight weeks, on a weekly basis, for gassing and mold production. The results were evaluated using the rating scale given below.

| Gas Evaluation Scale: | Mold Development Scale: |
|---|---|
| 1 - no ballooning | 1 - none |
| 2 - slight ballooning | 2 - slight |
| 3 - moderate ballooning | 3 - moderate |
| 4 - substantial ballooning | 4 - substantial |
| 5 - excessive ballooning | 5 - excessive |

The results are summarized in Table 4 below, where "B" means degree of ballooning, and "M" indicates degree of mold development according to the rating scale given above.

TABLE 4

| | Week 1 | | Week 2 | | Week 3 | | Week 4 | | Week 8 | |
|---|---|---|---|---|---|---|---|---|---|---|
| Example | B | M | B | M | B | M | B | M | B | M |
| Comp. 1 | 1 | 1 | 1 | 1 | 1 | 1 | 1 | 1 | 2 | 1 |
| Comp. 2 | 1 | 1 | 1 | 1 | 1 | 1 | 1 | 1 | 4 | 1 |
| Comp. 3 | 1 | 1 | 1 | 1 | 1 | 2 | 1 | 3 | 1 | 3 |
| 6 | 1 | 1 | 1 | 1 | 1 | 1 | 1 | 1 | 3 | 1 |
| 7 | 1 | 1 | 1 | 1 | 1 | 1 | 1 | 1 | 1 | 1* |
| 8 | 1 | 1 | 1 | 1 | 1 | 1 | 1 | 1 | 2 | 1 |
| 9 | 1 | 1 | 1 | 1 | 1 | 1 | 1 | 1 | 2 | 1 |

The asterisk at the last entry for Example 7 indicates that there was some slight mold growth at level 2 on one of the three replicate packages evaluated. The other two packages showed no signs of mold growth. It can be seen from this test that the film materials of the present invention perform very favorably when compared to conventional film materials.

EXAMPLE 10

A six layer structure was coextruded, irradiated, and oriented out of hot water at 209° F., at 2.6×3.3 in the machine and transverse directions, respectively. The resultant film had an average thickness of approximately 2.3 mils with the following structure and relative thicknesses:

| 80% EO1 + 20% ION | / 80% EVA-3 + 20% EO1 | / 80% EVA-3 + 20% EO1 | / 80% EVA-3 + 20% EO1 | / ADH-2 | / CPA-4 |
|---|---|---|---|---|---|
| 28% | / 19% | / 20% | / 19% | / 7% | / 7% |

EXAMPLE 11

A six layer structure was coextruded, irradiated, and oriented out of hot water at 209° F., at 2.6×3.3 in the machine and transverse directions, respectively. The resultant film had an average thickness of approximately 2.3 mils with the following structure and relative thicknesses:

| 80% EO1 + 20% ION | / 80% EVA-3 + 20% EO1 | / 80% EVA-3 + 20% EO1 | / 80% EVA-3 + 20% EO1 | / ADH-2 | / 90% CPA-3 + 10% EVOH |
|---|---|---|---|---|---|
| 28% | / 19% | / 18% | / 19% | / 7% | / 9% |

EXAMPLE 12

A six layer structure was coextruded, irradiated, and oriented out of hot water at 209° F., at 2.6×3.3 in the machine and transverse directions, respectively. The resultant film had an average thickness of approximately 2.3 mils with the following structure and relative thicknesses:

| 80% EO1 + 20% ION | / 80% EVA-3 + 20% EO1 | / 80% EVA-3 + 20% EO1 | / 80% EVA-3 + 20% EO1 | / ADH-2 | / 95% CPA-3 + 5% EVOH |
|---|---|---|---|---|---|
| 28% | / 19% | / 18% | / 19% | / 7% | / 9% |

EXAMPLE 13

A six layer structure was coextruded, irradiated, and oriented out of hot water at 209° F., at 2.6×3.3 in the machine and transverse directions, respectively. The resultant film had an average thickness of approximately 2.3 mils with the following structure and relative thicknesses:

| 80% EO1 + 20% ION | / 80% EVA-3 + 20% EO1 | / 80% EVA-3 + 20% EO1 | / 80% EVA-3 + 20% EO1 | / ADH-2 | / 85% CPA-3 + 10% EVOH + 5% PEA |
|---|---|---|---|---|---|
| 28% | / 19% | / 20% | / 19% | / 7% | / 7% |

EXAMPLE 14

A six layer structure was coextruded, irradiated, and oriented out of hot water at 209° F., at 2.6×3.3 in the machine and transverse directions, respectively. The resultant film had an average thickness of approximately 2.3 mils with the following structure and relative thicknesses:

| 80% EO1 + 20% ION | / 80% EVA-3 + 20% EO1 | / 80% EVA-3 + 20% EO1 | / 80% EVA-3 + 20% EO1 | / ADH-2 | / 95% CPA-3 + 5% PEA |
|---|---|---|---|---|---|
| 28% | / 19% | / 20% | / 19% | / 7% | / 7% |

EXAMPLE 15

A six layer structure was coextruded, irradiated, and oriented out of hot water at 209° F., at 2.6×3.3 in the machine and transverse directions, respectively. The resultant film had an average thickness of approximately 2.3 mils with the following structure and relative thicknesses:

| 80% EO1 + 20% ION | / 80% EVA-3 + 20% EO1 | / 80% EVA-3 + 20% EO1 | / 80% EVA-3 + 20% EO1 | / ADH-2 | / 85% CPA-3 + 15% PEA |
|---|---|---|---|---|---|
| 29% | / 20% | / 19% | / 20% | / 7% | / 5% |

EXAMPLE 16

A six layer structure was coextruded, irradiated, and oriented out of hot water at 209° F., at 2.6×3.3 in the machine and transverse directions, respectively. The resultant film had an average thickness of approximately 2.3 mils with the following structure and relative thicknesses:

| 80% EO1 + 20% ION | / 80% EVA-3 + 20% EO1 | / 80% EVA-3 + 20% EO1 | / 80% EVA-3 + 20% EO1 | / ADH-2 | / 95% CPA-4 + 5% PEA |
|---|---|---|---|---|---|
| 28% | / 19% | / 20% | / 19% | / 7% | / 7% |

EXAMPLE 17

A six layer structure was coextruded, irradiated, and oriented out of hot water at 209° F., at 2.6×3.3 in the machine and transverse directions, respectively. The resultant film had an average thickness of approximately 2.3 mils with the following structure and relative thicknesses:

| 80% EO1 + 20% ION | / 80% EVA-3 + 20% EO1 | / 80% EVA-3 + 20% EO1 | / 80% EVA-3 + 20% EO1 | / ADH-2 | / CPA-3 |
|---|---|---|---|---|---|
| 28% | / 19% | / 18% | / 19% | / 7% | / 9% |

EXAMPLE 18

A six layer structure was coextruded, irradiated, and oriented out of hot water at 209° F., at 2.6×3.3 in the machine and transverse directions, respectively. The resultant film had an average thickness of approximately 2.3 mils with the following structure and relative thicknesses:

| 80% EO1 + 20% ION | / 80% EVA-3 + 20% EO1 | / 80% EVA-3 + 20% EO1 | / 80% EVA-3 + 20% EO1 | / ADH-2 | / CPA-3 |
|---|---|---|---|---|---|
| 28% | / 18% | / 19% | / 18% | / 7% | / 11% |

The films of Examples 7, 10–13, 15–18 and Comparative Example 1 were fabricated into bags and were used in packaging uncured Swiss Cheese and Baby Swiss Cheese. The present study employed seven replicates for the Swiss Cheese (with the exception of Example 17 wherein only five replicates were available) and three replicates for the Baby Swiss Cheese. The sealed bags were placed in a 50° F. refrigerator at 55% relative humidity and evaluated over a period of fifteen weeks for gassing and mold production. In the present study, mold growth was not found on any of the samples evaluated. Furthermore, in the Baby Swiss Cheese test, all samples evaluated performed acceptably with no ballooning. The results with respect to gassing for the Swiss Cheese test are reported in accordance with the rating scale given below in Table 5.

Gas Evaluation Scale:
N=No ballooning
S=Slight ballooning
M=Medium ballooning
E=Excessive Ballooning

TABLE 5

| Example | Week 8 | | | | Week 15 | | | |
|---|---|---|---|---|---|---|---|---|
|  | N | S | M | E | N | S | M | E |
| Comp.1 | — | 7 | — | — | — | 2 | 2 | 3 |
| 7 | — | 7 | — | — | — | 6 | 1 | — |
| 10 | 2 | 2 | 3 | — | — | 1 | 2 | 4 |
| 11 | 1 | 5 | 1 | — | — | 4 | 2 | 1 |
| 12 | 1 | 6 | — | — | — | 5 | — | 2 |
| 13 | 5 | 2 | — | — | 3 | 3 | 1 | — |
| 15 | 6 | 1 | — | — | 5 | 2 | — | — |
| 16 | 5 | 2 | — | — | 4 | 1 | — | 2 |
| 17 | 2 | 3 | — | — | — | 4 | — | 1 |
| 18 | — | 3 | 4 | — | — | 1 | 3 | 3 |

Although the results indicate that all films tested performed as well or better film of Comparative Example 1, the films of Examples 13 and 15 outperformed the others. Generally, those films which included a moisture absorbing resin blended into a nylon terpolymer outer layer demonstrated less gassing than comparable films without such blend. It is believed that the presence of a moisture absorbing resin saturates the blend layer with moisture and, because nylon terpolymers in accordance with the presence invention exhibit an increase in $CO_2$ transmission rate with increasing relative humidity, $CO_2$ emission package is facilitated.

In general, the greater the percentage of the aromatic component in the nylon copolymer of the invention, the stiffer the material and the more difficult it would be to orient to make a heat shrinkable film. Also, if the percentage of the aromatic component in the nylon is too high, the $CO_2/O_2$ transmission ratio and/or values may be less than desirable and the resulting film may be excessively stiff or rigid, and/or have physical properties unsuitable for some packaging applications.

Another advantage of a film made from the present invention is that with decreasing temperature, the $O_2$ transmission rate decreases faster than the rate at which the $CO_2$ transmission decreases. This has the net effect, desirable in packaging applications such as gassing cheese, of increasing the $CO_2/O_2$ transmission ratio.

The foregoing description of preferred embodiments of the invention has been presented for illustration, and is not intended to be exhaustive. Modifications are possible in light of the above teachings or may be acquired from practice of the invention.

What is claimed is:

1. A multilayer film comprising:
   a layer comprising a nylon copolymer comprising an aromatic comonomer, wherein the aromatic comonomer comprises between 10% and 40% by weight of said copolymer; and
   a further polymeric layer,
   wherein said film is characterized by a $CO_2:O_2$ transmission ratio higher than 3.0; and has a $CO_2$ transmission rate of at least 400 cc/m$^2$-day-atmosphere.

2. The film material of claim 1 wherein said film material is oriented.

3. The film material of claim 1 wherein said film comprises a first outer layer comprising said nylon copolymer; a second outer layer; and an interior layer.

4. The film material of claim 1 wherein said film comprises a first outer layer; a second outer layer; and an interior layer comprising said nylon copolymer.

5. The film material of claim 1 wherein said nylon copolymer layer comprises a blend of the nylon copolymer and another polymeric resin.

6. The film material of claim 5 wherein said nylon copolymer layer comprises a blend of the nylon copolymer and an oxygen barrier resin.

7. The film material of claim 6 wherein said oxygen barrier resin comprises ethylene vinyl alcohol copolymer.

8. The film material of claim 5 wherein said nylon copolymer layer comprises a blend of the nylon copolymer and a moisture absorbing resin.

9. The film material of claim 8 wherein said moisture absorbing resin comprises a polyamide polyether block copolymer.

10. The film material of claim 1 wherein said $CO_2:O_2$ transmission ratio is greater than 5.0 at relative humidities above about 32%.

11. The film material of claim 1 wherein said further polymeric layer comprises a sealant layer.

12. The film material of claim 11 wherein said sealant layer comprises a polyolefin selected from ethylene, propylene, butene and methylpentene homopolymers and copolymers.

13. The film material of claim 1 wherein said nylon copolymer layer is heat sealable.

14. The film material of claim 1 wherein an adhesive layer is provided between said nylon copolymer layer and said further polymeric layer, said adhesive layer comprising a modified polyolefin capable of adhering to each of said nylon copolymer layer and said further polymeric layer.

15. The multilayer film material of claim 2 wherein the film is heat shrinkable.

16. A multilayer film comprising:
    a sealant layer;

a core layer; and a layer comprising a nylon copolymer comprising an aromatic comonomer, wherein the aromatic comonomer comprises between 10% and 40% by weight of said copolymer; and wherein said film is characterized by a $CO_2:O_2$ transmission ratio higher than 3.0, and has a $CO_2$ transmission rate of at least 400 cc/m$^2$-day-atmosphere.

17. The film material of claim 15 wherein said core layer comprises a polyolefin selected from ethylene, propylene, butene and methylpentene homopolymers and copolymers.

18. The film material of claim 17 wherein said core layer comprises a copolymer of ethylene and a comonomer selected from the group consisting of alpha, olefin, vinyl acetate, acrylate, acrylic acid, and methacrylic acid.

19. An oriented, heat shrinkable multilayer film comprising:

a first outer layer;

a second outer layer; and an interior layer comprising a nylon copolymer comprising an aromatic comonomer, wherein the aromatic comonomer comprises between 10% and 75% by weight of said copolymer; and wherein said film is characterized by a $CO_2:O_2$ transmission ratio higher than 3.0, and has a $CO_2$ transmission rate of at least 400 cc/m$^2$-day-atmosphere.

20. The multilayer film material of claim 19 further comprising an adhesive layer disposed between the interior layer and each of the outer layers.

21. The multilayer film material of claim 19 wherein said outer layers comprise a material selected from the group consisting of amide polymer and copolymer, ester polymer and copolymer, and olefin polymer and copolymer.

22. A multilayer oriented film comprises:

a layer comprising a nylon copolymer comprising an aromatic comonomer, wherein the aromatic comonomer comprises between 10% and 75% by weight of said copolymer; and a further polymeric layer, wherein said film is characterized by a $CO_2:O_2$ transmission ratio higher than 3.0; and has a $CO_2$ transmission rate of at least 400 cc/m$^2$-day-atmosphere.

23. The film of claim 22 wherein the film is heat shrinkable.

24. A package comprising:

a) an oxygen sensitive product which emits carbon dioxide gas; and b) a film, wrapped around the product, comprising a layer comprising a nylon copolymer comprising an aromatic comonomer, wherein the aromatic comonomer comprises between 10% and 75% by weight of said copolymer; and a further polymeric layer, wherein said film is characterized by a $CO_2:O_2$ transmission ratio higher than 3.0; and has a $CO_2$ transmission rate of at least 400 cc/m$^2$-day-atmosphere.

* * * * *

UNITED STATES PATENT AND TRADEMARK OFFICE
CERTIFICATE OF CORRECTION

PATENT NO. : 5,763,095
DATED : June 9, 1998
INVENTOR(S) : Ram K. Ramesh

Gautam P. Shah

It is certified that error appears in the above-identified patent and that said Letters Patent is hereby corrected as shown below:

claim 17, line 1:
    "of claim 15"    should read    "of claim 16"...

Signed and Sealed this

Eighteenth Day of August, 1998

Attest:

BRUCE LEHMAN

*Attesting Officer*    *Commissioner of Patents and Trademarks*